United States Patent
Althen

(10) Patent No.: US 12,141,802 B2
(45) Date of Patent: Nov. 12, 2024

(54) METHOD FOR PAYING A FEE FOR ALLOWING A VEHICLE TO USE A ROAD NETWORK THAT IS SUBJECT TO TOLL CHARGES, AND TOLL SYSTEM FOR PERFORMING THE METHOD

(71) Applicant: Yunex GmbH, Munich (DE)

(72) Inventor: Sebastian Althen, Munich (DE)

(73) Assignee: Yunex GmbH, Munich (DE)

( * ) Notice: Subject to any disclaimer, the term of this patent is extended or adjusted under 35 U.S.C. 154(b) by 89 days.

(21) Appl. No.: 17/771,604

(22) PCT Filed: Sep. 24, 2020

(86) PCT No.: PCT/EP2020/076718
§ 371 (c)(1),
(2) Date: Apr. 25, 2022

(87) PCT Pub. No.: WO2021/078465
PCT Pub. Date: Apr. 29, 2021

(65) Prior Publication Data
US 2022/0374890 A1    Nov. 24, 2022

(30) Foreign Application Priority Data
Oct. 23, 2019   (DE) .................. 10 2019 216 337.8

(51) Int. Cl.
*G06Q 20/40*       (2012.01)
*G06Q 20/38*       (2012.01)
(Continued)

(52) U.S. Cl.
CPC ......... *G06Q 20/40* (2013.01); *G06Q 20/3827* (2013.01); *G06Q 30/04* (2013.01); *G07B 15/06* (2013.01); *G06Q 2240/00* (2013.01)

(58) Field of Classification Search
CPC .... G06Q 20/40; G06Q 20/3827; G06Q 30/04; G06Q 2240/00; G07B 15/06
(Continued)

(56) References Cited

U.S. PATENT DOCUMENTS

2016/0097648 A1* 4/2016 Hannah ............... G08G 1/0116
                                                         701/118
2017/0178417 A1   6/2017 Bekas et al.
(Continued)

OTHER PUBLICATIONS

"Development of a GPS-based Highway Toll Collection System" Published by IEEE (Year: 2016).*

*Primary Examiner* — Zeina Elchanti
(74) *Attorney, Agent, or Firm* — Laurence A. Greenberg; Werner H. Stemer; Ralph E. Locher

(57) ABSTRACT

In a toll system for paying a fee for allowing a vehicle to use a road network, a random generator generates a random character string and transmits it to an electronic payment system and to a monitoring device for an on-road check on a usage authorization of vehicles using the road network. A user registers with the payment system in order to acquire a usage authorization and inputs a registration number of the vehicle intended for use. The payment system generates a hash value and transmits it to an electronic operator system of a toll operator. The monitoring device records a registration number of the vehicle and generates the hash value from the registration number and the currently valid character string. The operator system checks whether the hash value from the monitoring device matches a hash value from the payment system.

15 Claims, 1 Drawing Sheet

(51) Int. Cl.
  *G06Q 30/04* (2012.01)
  *G07B 15/06* (2011.01)
(58) Field of Classification Search
  USPC .......................................................... 705/13
  See application file for complete search history.

(56) References Cited

U.S. PATENT DOCUMENTS

2019/0005470 A1\* 1/2019 Uhr ........................ H04L 9/3239
2019/0058834 A1\* 2/2019 Kim ....................... G06F 1/3231

\* cited by examiner

METHOD FOR PAYING A FEE FOR ALLOWING A VEHICLE TO USE A ROAD NETWORK THAT IS SUBJECT TO TOLL CHARGES, AND TOLL SYSTEM FOR PERFORMING THE METHOD

FIELD AND BACKGROUND OF THE INVENTION

Charging a toll for the use of road structures is known around the world. Such fees are charged for the use of freeways or highways, of an inner-city road network or also of individual structures such as bridges or tunnels. In this context, fees may be charged for a temporally limited use of a route network or only for the route within the network that is actually used by a vehicle. It is likewise known to differentiate the charging or the amount of the toll according to the type and emission class of the vehicles. A wide range of methods are used both for paying the respective usage fee and also for monitoring the usage authorization, which are supported by toll systems that are automated to a greater or lesser extent.

Therefore it is known to construct barriers and payment stations at entrances into and exits out of a route section that is subject to a toll, at which the toll for the route section covered can be paid by cash or money card. Due to the payment procedure and the opening of the barrier, this method leads to queues and occasionally to considerable traffic restrictions.

In order to shorten the queues at payment and monitoring stations, it is known to already pay the usage fee before entering the road route that is subject to a toll, for example via an Internet portal or a smartphone application of the toll operator, wherein the official registration number of the vehicle intended for the use is registered.

At a road-side monitoring station, the registration number of a vehicle is detected by means of a video camera and compared with the registration numbers registered at the toll operator. If there is a match, a barrier can then be opened, for example. With this method, it is possible to pay and monitor a time-dependent toll. The route dependency, however, is predefined by the arrangement of the monitoring stations. Additionally, due to the registration number detection, it is possible to create movement profiles of the vehicles, which is concerning with regard to the protection of personal data and in some jurisdictions is even unlawful.

An inner-city toll system, in which the registration numbers of the vehicles are detected when entering the route network subject to a toll, has the same shortcomings. The usage fee charged is valid for a predefined time, for example for the rest of the day. In order to be able to charge a route-dependent toll for journeys inside this area, a considerable additional infrastructure expense for further detection stations would be necessary.

In order to charge a route-dependent toll, it is known to install specialized terminals for fee collection, which are known as on-board units, in vehicles, which on-board units use a satellite-based positioning system to ascertain the route subject to a toll that has been covered and, on the basis of its vehicle type, the amount of toll due, and also transmit the ascertained toll to a central computer of the toll system operator via a mobile radio interface. In this context, the vehicles intended for the use are to be registered with vehicle class and registration number at the toll system operator in advance. A checking of the toll payment takes place at monitoring stations, at which video data of passing vehicles is recorded by means of a video system and at which the terminal of the passing vehicle transfers the vehicle class and registration number by infrared communication. The video data is first evaluated as to whether the vehicle is a vehicle subject to a toll, and if this is the case, which registration number it has. The registration number is then compared with the registration number transmitted by the terminal. If there is a match, it can then be checked whether a payment of the toll has been booked in the central computer of the toll system operator for this vehicle. The disadvantage of this method is that all vehicles subject to a toll have to be equipped with terminals, including vehicle-side power supplies. There is also a disproportionately high infrastructure expense associated therewith.

SUMMARY OF THE INVENTION

The object underlying the invention is therefore to disclose a method and toll system, with which time-dependent and route-dependent road usage fees can be charged with free flow of traffic and the payment thereof can be monitored, without installation of specialized terminals in the vehicle and while respecting the privacy of the user.

The method-related aspect of the object is achieved by a method for paying a fee for the use of a road network subject to a toll by a vehicle. In this context, a random generator generates a random character string. The random generator is operated by an independent authority, for example a Technical Inspection Association, the German Federal Motor Transport Authority, a data protection organization or a voluntary monitoring authority, which has no further role in the toll method and therefore also does not come into contact with further data. At predefinable time intervals, the character string is generated anew, for example daily or also after other typical periods of time for a travel duration. The character string is preferably alphanumeric and is of a sufficient length, for example between 16 and 256 characters long.

The generated character string is then in each case transmitted to an electronic payment system of a payment service provider for transacting the fee payment as well as to a monitoring device for the road-side checking of a usage authorization of vehicles using the road network. In order to acquire a usage authorization, a user logs on to the payment system and, in doing so, enters a registration number of the vehicle intended for the use. The registration number of the vehicle is understood here to mean the officially registered motor vehicle registration number. The logging on may take place, for example, on the part of the driver or also a third party via a mobile terminal, for example a smartphone with corresponding application software, or online via a website of the payment service provider. Here, misuse by a third party is possible, but at most it is to their own detriment, as the fee payment would take place for someone else's vehicle.

The payment system then generates a hash value from the registration number and the currently valid character string by means of a hash algorithm. This involves what is known as a salted hash value, wherein the salt is formed by the randomly generated character string. The hash value is then used as an anonymized reference to the registration number of the vehicle. Other than forming the hash value, the payment service provider only processes standard tasks for electronic payment transactions. For example, the intended payment service provider for the local transport operators is considered. Ad hoc payment methods are possible for the payment of fees, for example by means of a PayPal account or a prepaid card.

The payment system transfers the generated hash value to an electronic operator system of a toll operator, which keeps the transferred hash value available for monitoring purposes. The operator system keeps a pool of hash values available, which are assigned to vehicles or the registration numbers thereof, for which a usage authorization is present.

By means of video recording and evaluation of a passing vehicle, the monitoring device detects a registration number of the vehicle. Monitoring devices may be arranged in a stationary manner at a fixed monitoring point in the road network or used in a mobile manner for alternating, random monitoring points. A monitoring device comprises a digital video camera for image recording of a vehicle passing the monitoring point as well as an image evaluation unit for identifying the registration number of the recorded vehicle by means of optical character recognition.

The monitoring device also generates the hash value from the detected registration number and the currently valid character string by means of the hash algorithm and transfers the generated hash value to the operator system. The operator system then checks whether the hash value transferred from the monitoring device matches one of the hash values that have been transferred from the payment system and are still kept available. Due to the payment system and monitoring device using the same hash algorithm, if there is a matching registration number, the same salted hash value is generated which can be used in the operator system to anonymously check a usage authorization.

What is critical for data protection is that it is not possible for the toll operator to reconstruct the registration number from the hash value without knowing the valid character string—the salt—in each case. With the method, it is possible to charge and monitor both a time-dependent and route-dependent toll while complying with data protection requirements, wherein it is possible for the user to use a smartphone with corresponding application software. This is achieved through the use of salted hash values with alternating salt, whereby personal data such as the registration number is effectively separated from movement-specific data such as the position at a particular time. Through the use of smartphones, it is possible to dispense with a specialized on-board unit installed in a fixed manner. It is possible to monitor the usage authorization without restricting the flow of traffic.

In a particular embodiment of the method according to the invention, the monitoring device generates an evidence dataset of a vehicle passage, wherein the monitoring device transmits the generated evidence dataset to the operator system when the result of the check in the operator system is that the hash value transferred by the monitoring device does not match any of the hash values that are still being kept available, and otherwise deletes the evidence dataset. If there is no match, then there is an initial suspicion of an improper use of the road network subject to a toll, meaning that the output of the evidence dataset is justification for a closer check of the situation. If a match has been found, the evidence dataset that contains personal data is immediately deleted again for data protection reasons.

In a further particular embodiment of the method according to the invention, the evidence dataset has a video image and the registration number of the passing vehicle as well as the monitoring time point. In order to be able to check an initial suspicion more closely, a video image is necessary, on which the registration number of the vehicle and possibly the driver are mapped, as well as the monitoring time point at which the video image was recorded.

In a further particular embodiment of the method according to the invention, the monitoring device deletes the evidence dataset once a predefinable period of time has elapsed, if the operator system does not request an evidence dataset within the period of time. In order for the personal data not to remain stored in the monitoring device for an unnecessarily long time, it is possible to set a period of time, after the elapsing of which the evidence dataset is deleted—regardless of whether it was requested by the operator system after the check. The period of time may be set in accordance with the national data protection requirements.

In a further particular embodiment of the method according to the invention, the payment system automatically transmits an electronic invoice for the fee payment to the user. Directly after the fee payment has been made, or later after the usage authorization has elapsed, the payment service provider can send the user an electronic invoice by means of the payment system. In addition to the fee amount, this may contain the data entered, such as registration number or also usage duration or route length used, in clear text. The user uses this as evidence in the event of a possible complaint.

In a further particular embodiment of the method according to the invention, a user logs on to the payment system in order to acquire a time-dependent usage authorization and in the process enters a registration number of the vehicle intended for the use as well as a usage period. The payment system then transacts the fee payment due for the usage period. If the fee payment is successful, the hash value is generated in the payment system and is transferred to the operator system with the desired usage period. The operator system then keeps the transferred hash value available for monitoring purposes until the usage period has elapsed. In the pool that is kept available, the hash values are stored with the associated usage durations, wherein a hash value is deleted once the usage duration has elapsed.

In a further particular embodiment of the method according to the invention, in order to acquire a route-dependent usage authorization, when entering the road network subject to a toll, a user logs on to the payment system via a mobile terminal that is also carried in the vehicle being used, and in the process enters the registration number of the vehicle. The payment system transfers the generated hash value to the operator system and to the terminal. The operator system keeps the transferred hash value available until the user logs out of the payment system again via the terminal when exiting the road network subject to a toll. The terminal determines its geographical position on an ongoing basis, for example via a GPS receiver, and transmits its currently determined position in each case with determination time point and hash value to the operator system at predefinable time intervals. For a hash value, a route length of a route covered by the assigned vehicle is determined from the transmitted positions in the operator system. This means that the route length necessary for charging the toll can be ascertained automatically, without generating a movement profile of a vehicle or user.

In a further particular embodiment of the method according to the invention, for a hash value, the operator system performs a plausibility check for the location and/or travel path and/or speed of the vehicle assigned to the hash value on the basis of the transmitted positions and determination time points. The plausibility check can be performed without it being possible to establish a reference to a vehicle or the person constituting the user. Anomalies can be marked from a data perspective, meaning that, for this hash value, during a monitoring, the evidence dataset can be transmitted to the operator system as an initial suspicion is justification for a check due to the anomaly.

In a further particular embodiment of the method according to the invention, once the user has logged out, the payment system requests the route length covered by the vehicle between entry and exit and requisitions the fee payment due for the route length from the operator system. In the case of the route-dependent toll, the user simply logs the exit via the terminal, for example by actuating an operating element on the touch screen of a mobile radio device, wherein in addition to the registration number the vehicle position and exit time point are also declared to the payment system. For this hash value, the payment system requests the route length covered between entry and exit of the assigned vehicle from the operator system. The operator system deletes the corresponding hash value after such a request.

In a further particular embodiment of the method according to the invention, the electronic invoice always, or following activation by the user, features the travel path covered and/or the route length thereof, for which the fee is charged. If the identification of the path traveled in the invoice is considered to be evidence by the user or in accordance with the prevailing legal position in the country of the road network and not as a potential invasion of privacy, then this can be easily implemented by the present method. It is also possible for the user to activate this evidence on a voluntary basis.

The system-related aspect of the object is achieved by a toll system for paying a fee for the use of a road network subject to a toll by a vehicle, which is embodied for performing a method as claimed.

Further properties and advantages of the invention will emerge from the following description of an exemplary embodiment with the aid of the drawings, in which, in a schematic illustration,

DETAILED DESCRIPTION OF THE INVENTION

Figure 1:
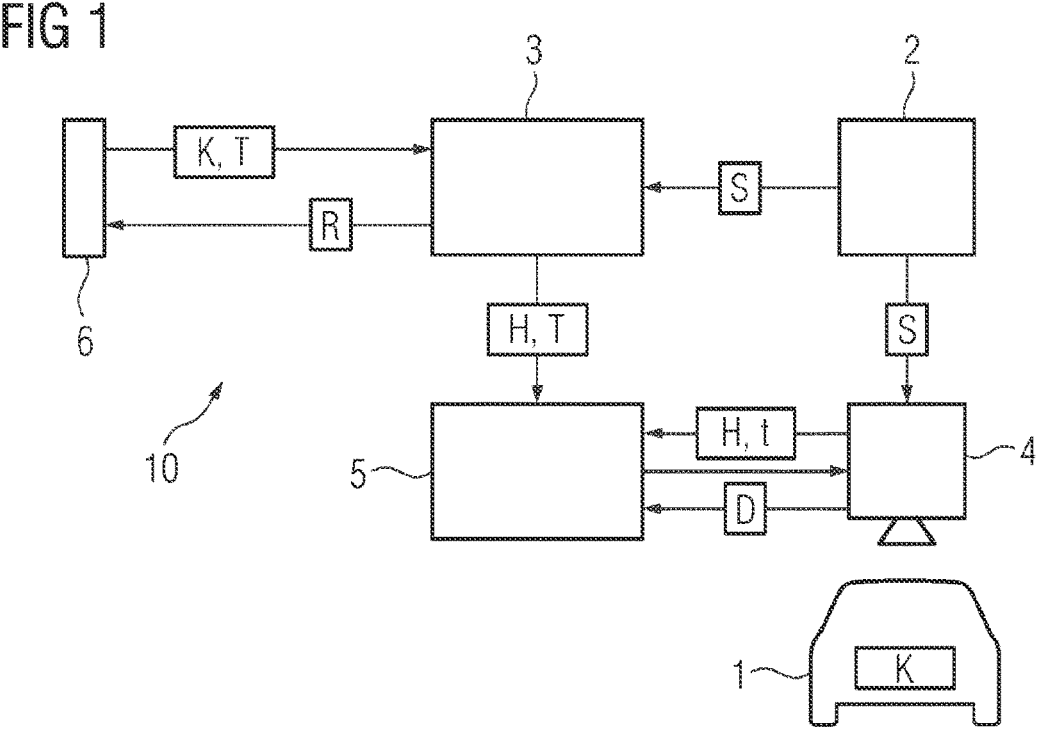
FIG. 1 shows a toll system for a time-dependent toll.
Figure 2:
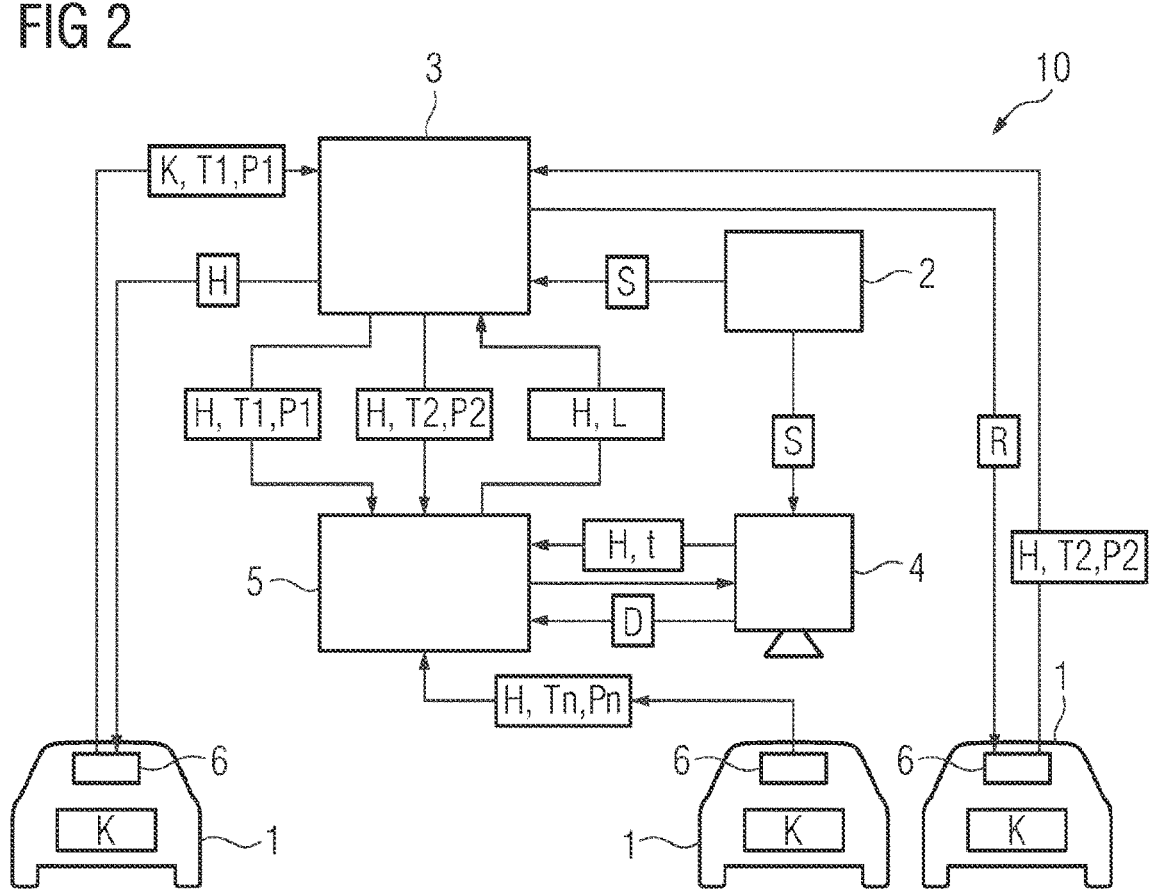
FIG. 2 shows a toll system for a route-dependent toll.

In accordance with FIG. 1 and FIG. 2, a toll system 10 according to the invention for paying a fee for the use of a road network subject to a toll by a vehicle 1 is embodied and provided.

The toll system 10 comprises a random generator 2, which generates a random character string S and is operated by an independent authority, for example a Technical Inspection Association, the German Federal Motor Transport Authority, a data protection organization or a voluntary monitoring authority. This authority has no further role in the toll method and therefore does not come into contact with further data. At predefinable time intervals, the character string S is generated anew, for example daily. The character string S is preferably alphanumeric and is of a sufficient length, for example between 16 and characters long.

The toll system 10 comprises an electronic payment system 3 of a payment service provider for transacting the fee payment with a user. In order to acquire a usage authorization, a user logs on in the payment system 3 and in the process enters a registration number K of the vehicle 1 intended for the use. The registration number K of the vehicle 1 is understood here to mean the officially registered motor vehicle registration number. The logging on may take place, for example, on the part of the driver or also a third party via a mobile terminal 5 of the toll system 10, for example a smartphone with corresponding application software, or online via a website of the payment service provider.

Furthermore, the toll system 10 comprises one or more monitoring devices 4 for detecting a registration number K of a vehicle 1. Monitoring devices 4 may be arranged in a stationary manner at a fixed monitoring point in the road network or used in a mobile manner for alternating, random monitoring points. A monitoring device 4 comprises a digital video camera for image recording of a vehicle 1 passing the monitoring point as well as an image evaluation unit for identifying the registration number K of the recorded vehicle 1 by means of optical character recognition.

The character string S generated by the random generator 2 is transmitted to the payment system 3 as well as to the monitoring device 4.

The payment system 3 generates a hash value H from the registration number K and the currently valid character string S by means of a hash algorithm. This involves what is known as a salted hash value, wherein the salt is formed by the randomly generated character string S. The hash value H is then used as an anonymized reference to the registration number K of the vehicle 1. Other than forming the hash value, the payment service provider only processes standard tasks for electronic payment transactions. For example, the intended payment service provider for the local transport operators is considered. Ad hoc payment methods are possible for the payment of fees, for example by means of a PayPal account or a prepaid card.

The toll system 10 additionally comprises an electronic operator system 5 of a toll operator, to which the payment system 3 transfers the generated hash value H and which keeps the transferred hash value H available for monitoring purposes. The operator system 5 therefore keeps a pool of hash values H available, which are assigned to vehicles 1 or the registration numbers K thereof, for which a usage authorization is currently present.

A monitoring device 4 also generates the hash value H from the detected registration number K and the currently valid character string S by means of the hash algorithm and transfers the generated hash value H to the operator system 5. The operator system 5 then checks whether the hash value H transferred from the monitoring device 4 matches one of the hash values H transferred from the payment system 3 and are still kept available. Due to the payment system 3 and monitoring device 4 using the same hash algorithm, if there is a matching registration number K, the same salted hash value H is generated which is used in the operator system 5 to anonymously check a usage authorization.

The monitoring device 4 generates an evidence dataset D of a vehicle passage and transmits it to the operator system 5 when the result of the check there is that the hash value H transferred by the monitoring device 4 does not match any of the hash values H that are still being kept available. Otherwise, the monitoring device 4 deletes the evidence dataset D. If there is no match, then there is an initial suspicion of an improper use of the road network subject to a toll, meaning that the output of the evidence dataset D is justification for a closer check of the situation. The evidence dataset D may have a video image and the registration number K of the passing vehicle 1 as well as the monitoring time point t. The monitoring device 4 deletes the evidence dataset D once a predefinable period of time has elapsed, if the operator system 5 does not request an evidence dataset within the period of time. The period of time may be set in accordance with the national data protection requirements.

The payment system 3 can automatically transmit an electronic invoice R for the fee payment to the user. In addition to the fee amount, this may contain the data entered, such as registration number K or also usage duration T or route length L used, in clear text. The user uses this as evidence in the event of a possible complaint.

According to FIG. 1, the toll system 10 supports a method for acquiring a time-dependent usage authorization, for example for daily, weekly or annual use of a road network subject to a toll.

The user logs on to the payment system 3 and in the process enters a registration number K of the vehicle 1 intended for the use as well as a usage period T. The payment system 3 then transacts the fee payment due for the usage period T. If the fee payment is successful, the hash value H is generated in the payment system 3 and is transferred with the desired usage period T to the operator system 5. The operator system 5 then keeps the transferred hash value H available for monitoring purposes until the usage period T has elapsed, after which it is automatically deleted.

According to FIG. 2, the toll system 10 also supports a method for acquiring a route-dependent usage authorization, for example between an entry into the route network chosen by the user and a later exit.

Here, a user also has to carry in their vehicle 1 the mobile terminal 6, which determines its geographical position Pn on an ongoing basis, for example via a GPS receiver. When entering the road network subject to a toll, the user logs on to the payment system 3 via the terminal 6 and in the process enters the registration number K of the vehicle 1; the entry position P1 and the entry time point T1 are transferred at the same time. The payment system 3 transfers the generated hash value H to the operator system 5 and to the terminal 6. The operator system 5 keeps the transferred hash value H available until the user logs out of the payment system 3 again via the terminal 6 when exiting the road network subject to a toll, wherein the hash value H is transferred with the exit position P2 and the exit time point T2. During travel, the terminal 6 transmits its currently determined position Pn in each case with determination time point Tn and hash value H to the operator system 5 at predefinable time intervals, for example every minute. For a hash value H, a route length L of a route covered by the assigned vehicle 1 is determined from the transmitted positions Pn in the operator system 5. In this context, it is not possible to generate a movement profile of a vehicle 1 while knowing the registration number K or the person constituting the user.

For a hash value H, however, the operator system 5 can perform a plausibility check for the location and/or travel path and/or speed of the vehicle 1 assigned to the hash value H on the basis of the transmitted positions Pn and determination time points Tn and mark anomalies from a data perspective, meaning that, for this hash value H, during a monitoring, the evidence dataset D can be transmitted to the operator system 5.

Once the user has logged out, the payment system 3 requests the route length L covered by the vehicle 1 assigned by a hash value H between entry and exit and transacts the fee payment due for the route length L from the operator system 5. The operator system 5 deletes the corresponding hash value H after such a request, as the user no longer has their usage authorization after exiting. The electronic invoice R may always, or following activation by the user, feature the travel path covered and/or the route length L thereof, for which the fee is charged.

The invention claimed is:

1. A method for paying a fee for the use of a road network subject to a toll by a vehicle, the method comprising:
   generating a random character string by a random generator and transmitting the random character string to an electronic payment system to transact a fee payment and to a monitoring device for a road-side checking of a usage authorization of vehicles using the road network;
   in order to acquire a usage authorization, logging on by a user to the payment system and entering a registration number of the vehicle intended for the use of the road network;
   generating a hash value by a processor of the payment system from the registration number and a currently valid character string by way of a hash algorithm;
   transferring the hash value generated by the payment system to an electronic operator system of a toll operator, and keeping the transferred hash value available for monitoring purposes;
   detecting by the monitoring device, from a video recording and an evaluation of a passing vehicle, a registration number of the vehicle, generating the hash value from the detected registration number and the currently valid character string by way of the hash algorithm and transferring the hash value generated by the monitoring device to the operator system;
   checking by the operator system whether the hash value transferred from the monitoring device matches one of the hash values that have been transferred from the payment system and kept available for the monitoring purposes;
   in order to acquire a route-dependent usage authorization, logging by a user on to the payment system via a mobile terminal that is also carried in the vehicle being used, and entering the registration number of the vehicle;
   transferring the generated hash value from the payment system to the operator system and to the terminal;
   keeping the transferred hash value available by the operator system until the user logs out of the payment system via the terminal when exiting the road network subject to the toll;
   determining with the terminal a geographical position on an ongoing basis and transmitting a currently determined position in each case with determination time point and hash value to the operator system at predefinable time intervals; and
   determining in the operator system for a hash value, a route length of a route covered by the assigned vehicle from the transmitted positions;
   transacting the fee payment by the payment system for the use of the road network determined for the vehicle; and
   automatically transmitting an electronic invoice for the fee payment from the payment system to the user.

2. The method according to claim 1, which comprises:
   generating with the monitoring device an evidence dataset of a vehicle passage; and
   transmitting the evidence dataset to the operator system when a result of the checking step in the operator system is that the hash value transferred by the monitoring device does not match any of the hash values that are being kept available, and otherwise deleting the evidence dataset.

3. The method according to claim 2, which comprises deleting with the monitoring device the evidence dataset once a predefinable period of time has elapsed, unless the operator system has requested an evidence dataset within the period of time.

4. The method according to claim 1, which comprises, for a hash value, performing with the operator system a plausibility check for at least one of a location or a travel path or a speed of the vehicle assigned to the hash value on a basis of the transmitted positions and determination time points.

5. The method according to claim 1, wherein, once the user has logged out, the payment system requests from the operator system a route length covered by the vehicle between an entry and an exit and transacts the fee payment due for the route length.

6. The method according to claim 5, which comprises generating an electronic invoice featuring at least one of the travel path covered or the route length thereof, for which the fee is charged.

7. The method according to claim 5, which comprises generating an electronic invoice and, upon activation by the user, including at least one of the travel path covered or the route length thereof, for which the fee is charged.

8. A toll system for paying a fee for a use of a road network subject to a toll by a vehicle, comprising:
an electronic payment system of a payment service provider to transact a fee payment;
a monitoring device for the road-side checking of a usage authorization of vehicles using the road network;
an electronic operator system of a toll operator;
a mobile terminal;
wherein the payment system has a terminal, and wherein in order to acquire a usage authorization, a user logs on to the payment system via the terminal and, in doing so, enters a registration number of the vehicle intended for the use of the road network;
wherein the payment system generates a hash value from the registration number and a currently valid character string by means of a hash algorithm,
wherein the payment system transfers the generated hash value to the electronic operator system of the toll operator, which keeps the transferred hash value available for monitoring purposes;
wherein, by means of video recording and evaluation of a passing vehicle, the monitoring device detects a registration number of the vehicle, also generates the hash value from the detected registration number and the currently valid character string by means of the hash algorithm and transfers the generated hash value to the operator system;
wherein the operator system checks whether the hash value transferred from the monitoring device matches one of the hash values that have been transferred from the payment system and are still kept available;
further comprising a random generator configured to generate at predefinable time intervals a new random character string, wherein the new character string is transmitted to the electronic payment system and to the monitoring device, and wherein the electronic payment system and the monitoring device, after the receipt of the new random character string, use the new random character string;
wherein, in order to acquire a route-dependent usage authorization, a user logs on to the payment system via a mobile terminal that is also carried in the vehicle being used, and in the process enters the registration number of the vehicle;
wherein the payment system transfers the generated hash value to the operator system and to the terminal;
wherein the operator system keeps the transferred hash value available until the user logs out of the payment system via the terminal when exiting the road network subject to a toll;
wherein the terminal determines its geographical position on an ongoing basis and transmits its currently determined position in each case with determination time point and the hash value to the operator system at predefinable time intervals;
wherein for the hash value, a route length of a route covered by the assigned vehicle is determined from the transmitted positions in the operator system;
wherein the payment system transacts the fee payment by for the use of the road network determined for the vehicle; and
wherein the payment system automatically transmits an electronic invoice for the fee payment to the user.

9. The toll system as claimed in claim 8, wherein for a hash value, the operator system performs a plausibility check for the location and/or travel path and/or speed of the vehicle assigned to the hash value on the basis of the transmitted positions and determination time points.

10. The toll system as claimed in claim 8, wherein:
the monitoring device generates an evidence dataset of a vehicle passage; and
the monitoring device transmits the generated evidence dataset to the operator system when the result of the check in the operator system is that the hash value transferred by the monitoring device does not match any of the hash values that are still being kept available, and otherwise deletes the evidence dataset.

11. The toll system as claimed in claim 10, wherein the evidence dataset has a video image and the registration number of the passing vehicle as well as the monitoring time point.

12. The toll system as claimed in claim 10, wherein the monitoring device deletes the evidence dataset once a predefinable period of time has elapsed, unless the operator system has requested an evidence dataset within the period of time.

13. The toll system as claimed in claim 8, wherein the payment system automatically transmits an electronic invoice for the fee payment to the terminal of the user.

14. The toll system as claimed in claim 8, wherein once the user has logged out, the payment system requests the route length covered by the vehicle between entry and exit and transacts the fee payment due for the route length from the operator system by means of a PayPal® account or a prepaid card.

15. A toll system for paying a fee for the use of a road network subject to a toll by a vehicle, comprising:
an electronic payment system of a service provider to transact a fee payment;
a monitoring device for the road-side checking of a usage authorization of vehicles using the road network;
an electronic operator system of a toll operator;
wherein the payment system has a mobile terminal, wherein, in order to acquire a route-dependent usage authorization, a user logs on to the payment system via the mobile terminal that is also carried in the vehicle being used, and in the process enters the registration number of the vehicle;
wherein the payment system generates a hash value from the registration number and a currently valid character string by means of a hash algorithm;

wherein the payment system transfers the generated hash value to the electronic operator system of a toll operator, which keeps the transferred hash value available for monitoring purposes;

wherein the payment system transfers the generated hash value to the terminal;

wherein, by means of video recording and evaluation of a passing vehicle, the monitoring device detects a registration number of the vehicle, also generates the hash value from the detected registration number and the currently valid character string by means of the hash algorithm and transfers the generated hash value to the operator system;

wherein the operator system checks whether the hash value transferred from the monitoring device matches one of the hash values that have been transferred from the payment system and are still kept available;

wherein the monitoring device generates an evidence dataset of a vehicle passage; and wherein the monitoring device transmits the generated evidence dataset to the operator system when the result of the check in the operator system is that the hash value transferred by the monitoring device does not match any of the hash values that are still being kept available, and otherwise deletes the evidence dataset;

wherein the operator system keeps the transferred hash value available until the user logs out of the payment system via the terminal when exiting the road network subject to a toll;

wherein the terminal determines its geographical position on an ongoing basis and transmits its currently determined position in each case with determination time point and the hash value to the operator system at predefinable time intervals;

wherein for the hash value, a route length of a route covered by the assigned vehicle is determined from the transmitted positions in the operator system;

wherein the payment system transacts the fee payment due for the route length from the operator system; and wherein the payment system automatically transmits an electronic invoice for the fee payment to the user.

\* \* \* \* \*